(12) United States Patent
Gonella et al.

(10) Patent No.: US 12,427,809 B2
(45) Date of Patent: Sep. 30, 2025

(54) NON-PNEUMATIC TIRE

(71) Applicant: Regents of the University of Minnesota, Minneapolis, MN (US)

(72) Inventors: Stefano Gonella, Saint Paul, MN (US); William Zunker, Verona, WI (US)

(73) Assignee: Regents of the University of Minnesota, Minneapolis, MN (US)

( * ) Notice: Subject to any disclaimer, the term of this patent is extended or adjusted under 35 U.S.C. 154(b) by 478 days.

(21) Appl. No.: 17/527,637

(22) Filed: Nov. 16, 2021

(65) Prior Publication Data

US 2022/0153061 A1   May 19, 2022

Related U.S. Application Data (60) Provisional application No. 63/115,911, filed on Nov. 19, 2020.

(51) Int. Cl.
  *B60C 7/10* (2006.01)
  *B60C 7/14* (2006.01)

(52) U.S. Cl.
  CPC .......... *B60C 7/107* (2021.08); *B60C 7/143* (2013.01); *B60C 7/146* (2021.08)

(58) Field of Classification Search
  USPC ...................................................... 152/326
  See application file for complete search history.

(56) References Cited

U.S. PATENT DOCUMENTS

| | | | | |
|---|---|---|---|---|
| 4,169,494 A | * | 10/1979 | Kubica | B60C 7/12 152/310 |
| 4,945,962 A | * | 8/1990 | Pajtas | B60C 7/107 152/7 |

(Continued)

FOREIGN PATENT DOCUMENTS

| | | | | |
|---|---|---|---|---|
| CN | 202641265 U | | 1/2013 | |
| CN | 107839403 A | * | 3/2018 | ............. B60B 19/00 |

(Continued)

OTHER PUBLICATIONS

Wu et al., "Research on non-pneumatic tire with gradient anti-tetrachiral structures", Mechanics of Advanced Materials and Structures, vol. 28:22, Mar. 2020, pp. 2351-2359.

(Continued)

*Primary Examiner* — S. Joseph Morano
*Assistant Examiner* — Eva L Comino
(74) *Attorney, Agent, or Firm* — Dicke, Billig & Czaja, PLLC (57) ABSTRACT

A non-pneumatic tire defining axial, radial, and circumferential directions. The tire includes an annular lattice structure extending radially between an inner circumferential edge and an outer circumferential edge. The lattice structure exhibits topological polarization, with the inner circumferential edge being stiffer than the outer circumferential edge. The topological polarization includes asymmetry in mechanical response to opposing forces applied to the inner and outer circumferential edges. The lattice structure which provides topological polarization endows the tire with localized softness along the outer radius, which enables extreme absorption of asperities, without transferring significant forces to the axle. In some embodiments, the lattice structure further exhibits topological protection, including the topological polarization characteristics being maintained upon experiencing wear at the outer circumferential edge. In some embodiments, the lattice structure is, or is akin to, a Kagome lattice arrangement.

18 Claims, 10 Drawing Sheets

(56) References Cited

U.S. PATENT DOCUMENTS

| | | |
|---|---|---|
| 7,950,428 B2 | 5/2011 | Hanada et al. |
| 8,056,593 B2 | 11/2011 | Palinkas et al. |
| 8,104,524 B2 | 1/2012 | Manesh et al. |
| 8,113,253 B2 * | 2/2012 | Arakawa ................... B60B 9/10 |
| | | 152/301 |
| 8,276,628 B2 | 10/2012 | Hanada et al. |
| 8,517,068 B2 | 8/2013 | Delfino et al. |
| 8,609,220 B2 * | 12/2013 | Summers ................ B60B 23/10 |
| | | 428/116 |
| 8,651,156 B2 * | 2/2014 | Fadel ...................... B60C 7/18 |
| | | 152/450 |
| 8,851,131 B2 | 10/2014 | Luchini et al. |
| 8,950,451 B2 | 2/2015 | Abe |
| 9,120,351 B2 | 9/2015 | Mun et al. |
| 9,266,388 B2 | 2/2016 | Schaedler et al. |
| 9,333,799 B2 | 5/2016 | Choi et al. |
| 9,751,270 B2 | 9/2017 | Thompson |
| 9,895,933 B2 | 2/2018 | Sugiya et al. |
| 10,040,314 B2 | 8/2018 | Siegel |
| D833,380 S * | 11/2018 | Martin ......................... D12/605 |
| 10,569,601 B2 | 2/2020 | Reinhardt |
| 11,179,969 B2 * | 11/2021 | Thompson .......... B60C 11/0311 |
| 2013/0167990 A1 | 7/2013 | Bae |
| 2014/0062171 A1 | 3/2014 | Martin et al. |
| 2015/0136286 A1 | 5/2015 | Matsuda et al. |
| 2018/0361794 A1 | 12/2018 | Manesh et al. |
| 2019/0126684 A1 | 5/2019 | Celik et al. |
| 2020/0047561 A1 | 2/2020 | Wei et al. |
| 2020/0139754 A1 | 5/2020 | Youn et al. |
| 2020/0139763 A1 | 5/2020 | Youn et al. |
| 2020/0215855 A1 | 7/2020 | Knospe |
| 2020/0247180 A1 | 8/2020 | Kashiwai et al. |
| 2020/0276861 A1 | 9/2020 | Thompson et al. |
| 2020/0316998 A1 | 10/2020 | Rhyne et al. |
| 2022/0072906 A1 * | 3/2022 | Nesbitt ................... B60C 7/143 |

FOREIGN PATENT DOCUMENTS

| | | | | |
|---|---|---|---|---|
| CN | 208247518 U | | 12/2018 | |
| CN | 109648849 A | | 4/2019 | |
| CN | 210149089 U | | 3/2020 | |
| EP | 2177375 A1 | * | 4/2010 | ............ B29D 30/00 |
| JP | 2006219134 A | | 8/2006 | |
| WO | WO-2014036415 A1 | * | 3/2014 | ............ B29D 30/02 |
| WO | 2019118225 A1 | | 6/2019 | |
| WO | WO-2020101844 A1 | * | 5/2020 | ............ B60B 21/10 |
| WO | WO-2020139680 A1 | * | 7/2020 | ............ B29D 30/02 |

OTHER PUBLICATIONS

Ganniari-Papageorgiou et al., "The Influence of the Honeycomb Design Parameters on the Mechanical Behavior of Non-Pneumatic Tires", International Journal of Applied Mechanics, vol. 12, No. 3, Apr. 2020, pp. 2050024-1-2050024-15.

Shankar et al., "Comparative Study of Optimization Techniques in Sizing Mesostructures for Use in NonPneumatic Tires", Journal of Computing and Information Science in Engineering, vol. 15, Dec. 2015, pp. 041009-1-041009-6.

Almonti et al., "Design and Thermal Comparison of Random Structures Realized by Indirect Additive Manufacturing", Materials, vol. 12: 2261, Jul. 2019, pp. 1-13.

Youqun et al., "Static stiffness characteristics of a new non-pneumatic tire with different hinge structure and distribution", Springer, Journal of Mechanical Science and Technology, vol. 32:7, Mar. 2018, pp. 3057-3064.

* cited by examiner

NON-PNEUMATIC TIRE

RELATED APPLICATIONS

This Non-Provisional patent application claims the benefit of the filing date of U.S. Provisional Patent Application Ser. No. 63/115,911, filed Nov. 19, 2020, entitled "NON-PNEUMATIC TIRE," the entire teachings of which are incorporated herein by reference.

STATEMENT REGARDING FEDERALLY SPONSORED RESEARCH OR DEVELOPMENT

This invention was made with government support under EFRI-1741618 awarded by the National Science Foundation. The government has certain rights in this invention.

BACKGROUND

The present disclosure relates to tires for vehicles. More particularly, it relates to non-pneumatic tires for vehicles.

Pneumatic tires for vehicles have been dominant for the past century. Their applications spread through countless industries including automotive (e.g., passenger vehicles, trucks, motorcycles, etc.), farming, mining and aerospace to name but a few. Pneumatic tires are generally viewed to have several beneficial attributes, such as high load per unit mass capability, large contact area that facilitates an even wear pattern, distribution of forces throughout the tire, exceptional handling and maneuverability, and providing a cushioned ride.

While universally accepted, pneumatic tires are not without drawbacks. For example, reliance on pressurized air leaves pneumatic tires vulnerable to rapid performance deterioration in the event of material damage (e.g., wheel puncture and subsequent loss of air pressure). The user is required to constantly check and maintain a proper air pressure. Also, the numerous steps in the pneumatic tire manufacturing process can be complex and can generative substantial levels of pollution.

In order to address the above problems (and others), efforts have been made to develop non-pneumatic tires. Non-pneumatic tires, also known as flat-free tires, are tires not supported by gas pressure. Some non-pneumatic tires use spokes between a hub portion and a tread portion for support. When such a non-pneumatic tire rolls on or over an object such as a speed bump or a pothole, among others, some of the spokes of the tire are subjected to compressive loads while other spokes are subjected to tensile loads. Spokes that are between the hub portion and the tread portion that hit or impact the object undergo compressive strain and spokes positioned on an opposite side of the wheel portion relative undergo tensile strain.

Though potentially viable, existing non-pneumatic tire constructions and designs are less than optimal. For example, non-pneumatic tires are often significantly stiffer than their pneumatic counterparts. This subjects occupants of a vehicle utilizing the non-pneumatic tires to a substantively less-cushioned ride and is frequently stated as a factor in the lack of usage of non-pneumatic tires in certain industries (e.g., automotive industry). Non-pneumatic tires are typically heavier than pneumatic tires. Non-pneumatic tires have an equivalent and sometimes shorter lifespan than pneumatic tires because of reliance on buckling of the spokes to bear loads. Further, and similar to pneumatic tires, an outer thread on a conventional non-pneumatic tire can erode from wear rendering it unusable.

SUMMARY

The inventors of the present disclosure recognized that a need exists for non-pneumatic tires that address one or more of the above problems.

Some aspects of the present disclosure relate to a non-pneumatic tire defining axial, radial, and circumferential directions. The non-pneumatic tire includes an annular lattice structure extending radially between an inner circumferential edge and an outer circumferential edge. The lattice structure exhibits topological polarization. The topological polarization can include or imply the inner circumferential edge being stiffer than the outer circumferential edge and asymmetry in mechanical response to opposing forces applied to the inner and outer circumferential edges. In some embodiments, the lattice structure further exhibits topological protection, including the topological polarization characteristics being maintained upon experiencing changes in geometry at the outer circumferential edge, such as those caused by wear. In some embodiments, the lattice structure is akin to a Kagome lattice arrangement, such as an altered Kagome lattice or perturbed Kagome lattice.

Other aspects of the present disclosure relate to a non-pneumatic tire defining axial, radial, and circumferential directions. The non-pneumatic tire includes an inner annular band and an annular lattice structure. The lattice structure extends radially from the inner annular band, and defines a plurality of circumferential layers each with a quasi-periodically repeating pattern of circumferentially-aligned openings. The circumferential layers include a first circumferential layer and a second circumferential layer. The second circumferential layer is immediately radially outside of, and circumferentially surrounds, the first circumferential layer. The openings of the first circumferential layer are circumferentially off-set from the openings of the second circumferential layer. In some embodiments, each of the openings defines a hexagonal shape in a radial plane perpendicular to a central axis of the tire. In related embodiments, the hexagonal shape is an irregular hexagon. A material web of the lattice structure interconnects the openings of the circumferential layers. In some embodiments, a support arrangement is defined by the material web between two, immediately adjacent openings of a first circumferential layer, with this hinge being directly connected to four other hinges defined between the two, immediately adjacent openings and openings of immediately radially inward and outward circumferential layers.

The lattice structures implemented by the non-pneumatic tires of the present disclosure can provide one or both of topological polarization and topological protection, in direct contrast to conventional non-pneumatic tire designs. When mounted to a vehicle's axle, the non-pneumatic tire lattice structure exhibits localized softness along the outer circumference due to topological polarization, enabling absorption of asperities encountered during use without transferring significant forces to the axle. This localized softness can optionally serve as a quasi-suspension system. Regardless, the non-pneumatic tire exhibits a remarkably stiffer response to distributed loading that results in practical weight bearing capabilities. The mechanical behavior of the outer edge is preserved even if entire radial cell layers have been eroded by wear due to topological protection. Also, the designs of the present disclosure are highly amenable to rapid manufacturing. The lattice designs can be based on a 2D profile that is extruded into the third dimension, and is thus highly appropriate, for example, for 3D printing.

DETAILED DESCRIPTION

Aspects of the present disclosure relate to non-pneumatic tires including or incorporating an annular lattice structure, such as a Kagome or Kagome-like lattice structure. As described in greater detail below, some of the non-pneumatic tires of the present disclosure uniquely exhibit or are characterized by topological polarization and topological protection. The topological polarization endows the tire with localized softness at an outer circumferential edge that readily absorbs asperities in the terrain, and facilitates a cushioned ride while also providing rigidity or stiffness at an inner circumferential edge. The topological polarization provides asymmetry in the mechanical response when forces are applied to opposite ends or sides of the lattice structure. Topological protection is in reference to the topological polarization being a feature of the bulk lattice structure (and not being unique to the circumferential edges). Outer circumferential layers can be peeled or worn away, yet the topological polarization attributes are preserved in what remains of the lattice structure.

Figure 1:
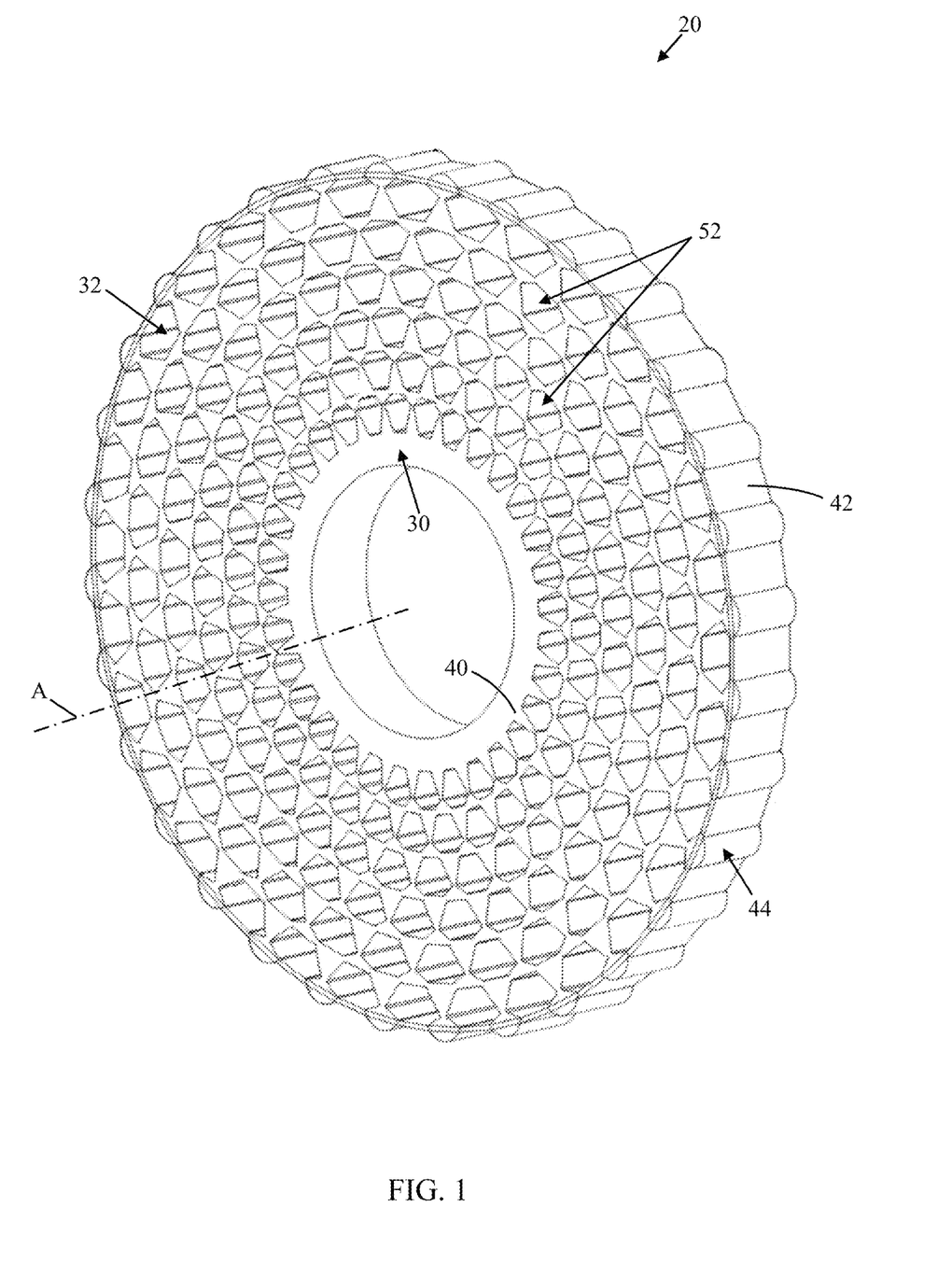
FIG. 1 is a perspective view of a non-pneumatic tire in accordance with principles of the present disclosure.
Figure 2:
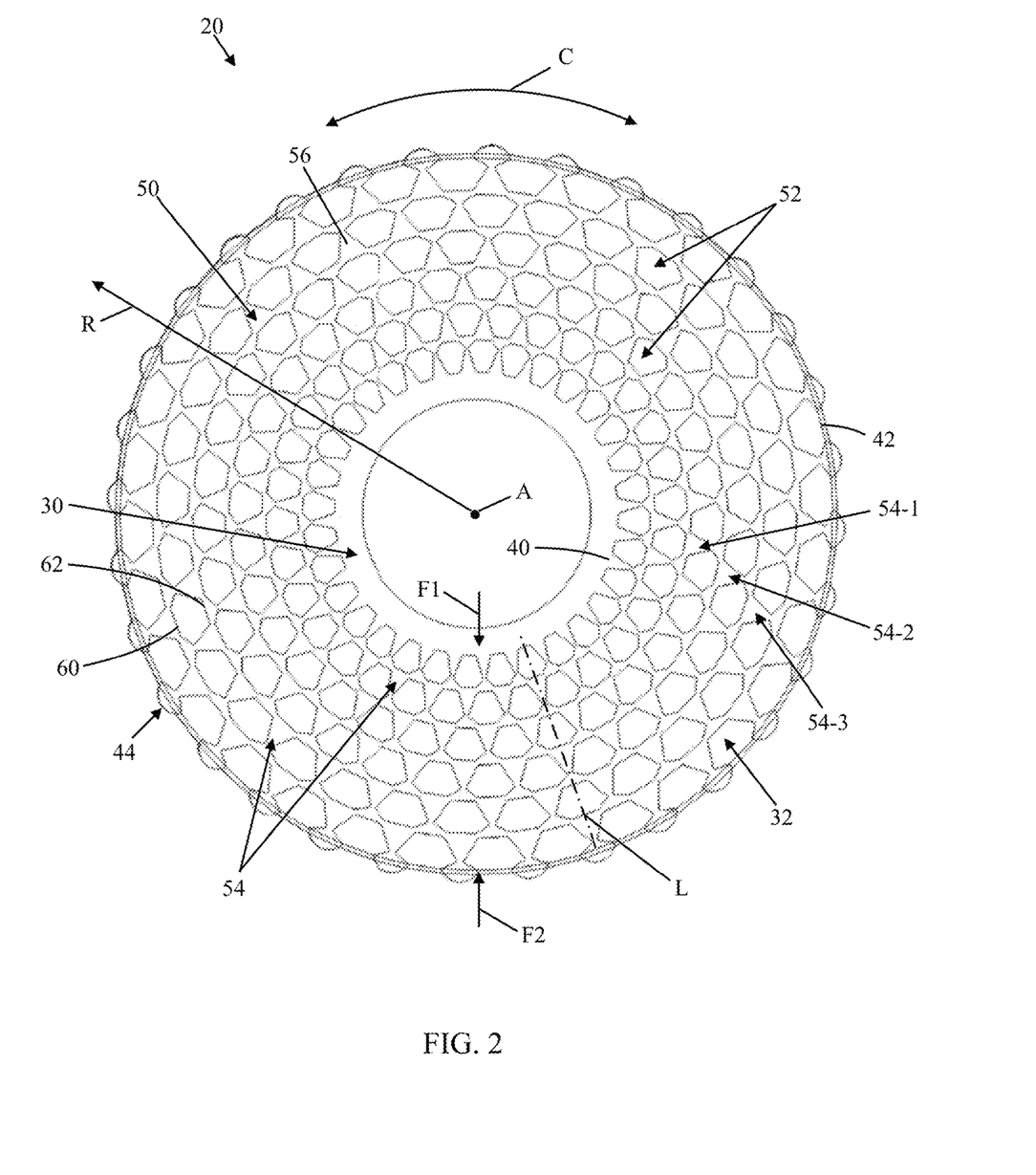
FIG. 2 is a side plan view of the non-pneumatic tire of FIG. 1.

With the above in mind, one embodiment of a non-pneumatic tire 20 in accordance with principles of the present disclosure is shown in FIGS. 1 and 2. An annular shape or configuration of the non-pneumatic tire 20 defines a central axis A; relative to this central axis A, the non-pneumatic tire 20 can be viewed as defining an axial direction along the central axis A, as well as a radial direction R and a circumferential direction C. With this in mind, in some embodiments, the non-pneumatic tire 20 includes or defines an inner annular band 30 and a lattice structure 32. The lattice structure 32 extends radially outward from, and circumferentially surrounds, the inner annular band 30, and can be viewed as forming or defining an inner circumferential edge 40 opposite an outer circumferential edge 42. In some embodiments, the outer circumferential edge 42 serves as, or as part of, the exposed outer surface of the non-pneumatic tire 20 (e.g., the outer circumferential edge 42 of the lattice structure 32 is not covered or encompassed by another material body, and is otherwise exposed). Outward protrusions 44 can optionally be formed at or along the outer circumferential edge 42 in some embodiments. Regardless, the non-pneumatic tire 20 is generally configured for mounting to an axle of vehicle (not shown) at the inner annular band 30 in a conventional manner (e.g., the inner annular band 30 is mounted directly to the axle, a conventional hub (with or without a bearing assembly) is secured to the inner annular band 30 and serves to mount the wheel 20 to the axle, etc.). During operation of the vehicle, the outer circumferential edge 42 rolls over terrain, with the optional outward protrusions 44 providing additional traction.

In general terms, the lattice structure 32 is a three-dimensional open-celled structure composed of one or more quasi-periodically repeating unit cells. The repeating unit cells can assume various forms, and are generally configured to collectively exhibit topological polarization in the form of asymmetry in the mechanical response when forces are applied to opposite ends or sides of the lattice structure 32. By forming the lattice structure 32 to be annular or ring-like, this asymmetry is relative to the inner and outer circumferential edges 40, 42. For example, the lattice structure 32 exhibits asymmetry in mechanical response to opposing forces F1, F2 applied to the inner and outer circumferential edges 40, 42, respectively. With this construction, the outer circumferential edge 42 is softer or less stiff as compared to the inner circumferential edge 40. The edge stiffness at the inner circumferential edge 40 can be multiple times greater than that at the outer circumferential edge 42. The topological polarization can serve a dual function when the non-pneumatic tire 20 is mounted to the vehicle's axle (not shown) at the inner annular band 30 and the outer circumferential edge 42 rolls over terrain. The soft, outer circumferential edge 42 provides localized softness that enables absorption of terrain asperities and serves as a quasi-suspension system. The stiff, inner circumferential edge 40 provides a rigid structure for the inner annular band 30 (or a hub applied thereto) and the axle to exert forces upon. As outer circumferential layers of the lattice structure 32 wears away, the topological polarization attributes are preserved in what remains of the lattice structure 32 (e.g., due to the topological protection attributes mentioned elsewhere, the topological polarization is not unique to the edges but rather is a property of the bulk lattice structure 32, etc.).

As generally identified in FIG. 2, the repeating cells of the lattice structure 32 are generated by a material web 50 interconnecting a plurality of openings 52. The openings 52 extend through a thickness of the lattice structure 32 (e.g., a centerline of the shape of each opening is parallel with the central axis A), and can have the attributes or features as described in greater detail below. In general terms, and relative to the plane of FIG. 2 (that is otherwise a radial plane perpendicular to the central axis A), the lattice structure 32 can be viewed as defining a plurality of circumferential layers or bands 54 each with a repeating pattern of circumferentially-aligned openings 52 (i.e., the openings 52 in each respective layer 54 are aligned with one another in the circumferential direction C). The material web 50 forms discernable support arrangements (one of which is generally labeled at 56 in FIG. 2) between and interconnecting circumferentially adjacent ones of the openings 52 within each layer 54, as well as between immediately adjacent ones of the openings 52 of neighboring or radially adjacent layers 54. While FIGS. 1 and 2 reflect the lattice structure 32 as having six of the layers 54, any other number, either greater or lesser within certain bounds, is also acceptable. The openings 52 of each layer 54 can be identical in size and shape, as can portions of the corresponding support arrangements 56; while a size of the openings 52 can vary from layer-to-layer 54, an overall geometrical shape of the openings 52 in the plane perpendicular to the central axis A can be identical (e.g., all of the openings 52 can be the same polygonal shape). In some embodiments, each of the openings 52 forms a hexagonal shape in a radial plane perpendicular to the central axis A, for example an irregular hexagon. Other shapes are also envisioned.

While the lattice structure 32 can assume various forms that provide topological polarization between the inner and outer circumferential edges 40, 42, in some embodiments, the lattice structure 32 is or is akin to a Kagome lattice arrangement (e.g., an altered Kagome lattice or perturbed Kagome lattice). Kagome lattices can be described as intersecting webs of "corner-sharing triangles". With some embodiments of the present disclosure, the lattice structure 32 can be viewed as a Kagome-type lattice in rectangular form that has been mapped to a circular domain. Regardless, the openings 52 of each of immediately radially adjacent ones of the circumferential layers 54 are circumferentially off-set from one another. For example, first, second, and third circumferential layers 54-1, 54-2, and 54-3 are labeled in FIG. 2. The second circumferential layer 54-2 is immediately radially adjacent the first and third circumferential layers 54-1, 54-3 (the phrase "immediately radially adjacent" is intended to mean that there are no other circumferential layers 54 between the first and second circumferential layers 54-1, 54-2, nor between the second and third circumferential layers 54-2, 54-3). In other words, the second circumferential layer 54-2 is immediately radially outside of, and circumferentially surrounds, the first circumferential layer 54-1; the third circumferential layer 54-3 is immediately radially outside of, and circumferentially surrounds, the second circumferential layer 54-2. With these definitions in mind, FIG. 2 reveals that the openings 52 of the second circumferential layer 54-2 are circumferentially off-set from the openings 52 of the first circumferential layer 54-1, and from the openings 52 of the third circumferential layer 54-3. Stated otherwise, the openings 52 of the second circumferential layer 54-2 are not radially aligned with the openings 52 of the first and third circumferential layers 54-1, 54-3. For example, a hypothetical line L of FIG. 2 is in a radial plane perpendicular to the central axes A and extends between the inner and outer edges 40, 42; the line L bisects a shape of one of the openings 52 of the first circumferential layer 54-1, but does not bisect a shape of any of the openings 52 of the second circumferential layer 54-2. In some embodiments, the line L also bisects a shape of one of the openings 52 of the third circumferential layer 54-3.

Figure 3:
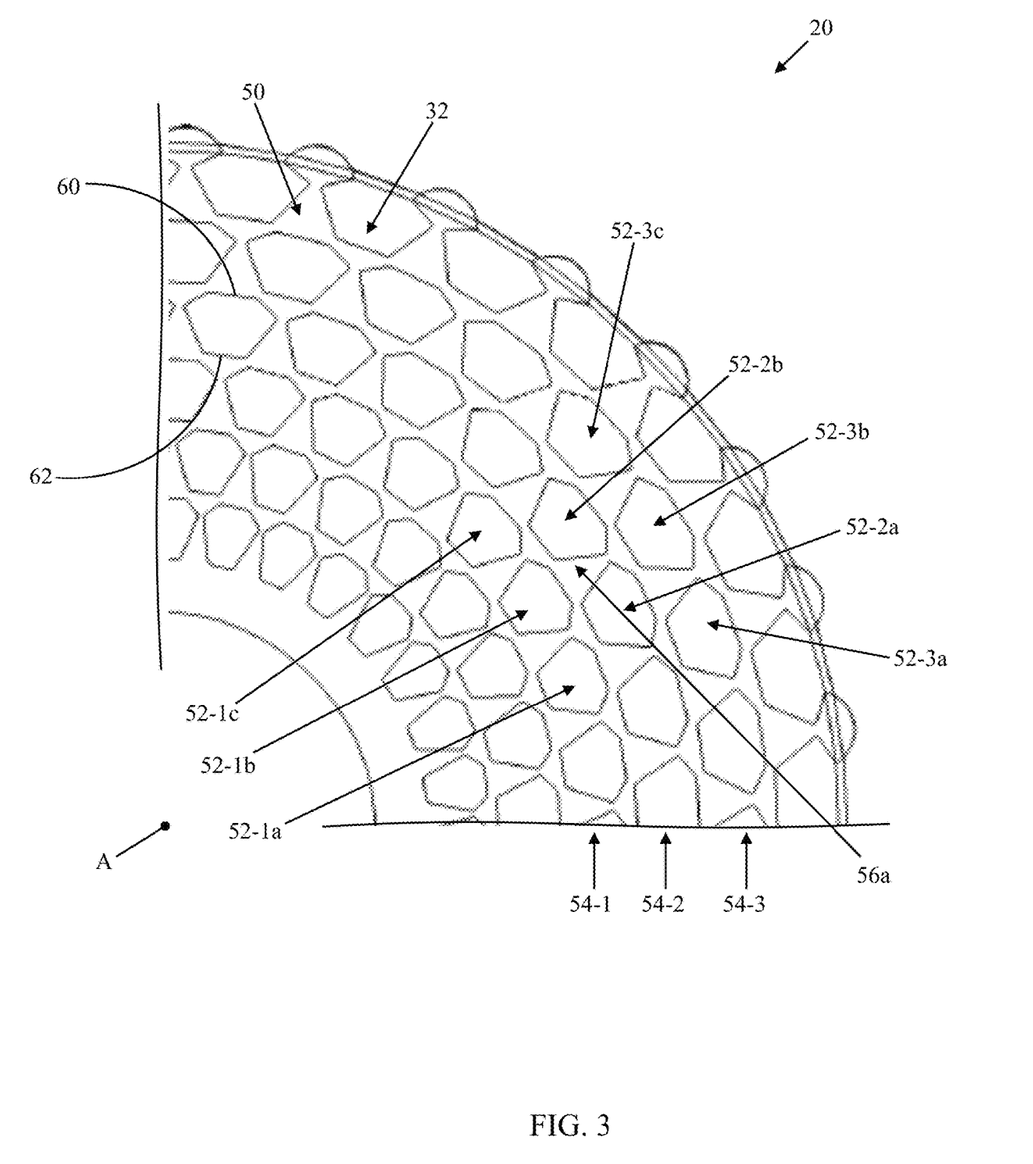
FIG. 3 is an enlarged side view of a segment of the non-pneumatic tire of FIG. 1.

Geometrical details of the lattice structure 32 can be further described with reference to the enlarged view of FIG. 3 that otherwise illustrates a quarter or ninety degree segment of the non-pneumatic tire 20, and thus of the circular lattice structure 32. The first, second, and third circumferential layers 54-1, 54-2, and 54-3 are labeled in FIG. 3. Within the second circumferential layer 54-2, first and second, immediately circumferentially adjacent ones of the openings are labeled at 52-2a, 52-2b (the phrase "immediately circumferentially adjacent" is intended to mean that there are no other openings 52 of the second circumferential layer 54-2 that are between the first and second openings 52-2a, 52-2b). Openings of the first and third circumferential layers 54-1, 54-3 otherwise closest to or most proximate the first and second openings 52-2a, 52-2b are also labeled in FIG. 3, including first, second, and third openings 52-1a, 52-1b, and 52-1c of the first circumferential layer 54-1, and first, second, and third openings 52-3a, 52-3b, and 52-3c of the third circumferential layer 54-3.

With the above definitions in mind, each of the openings 52 has the same general polygonal shape (an irregular hexagon) in the radial plane perpendicular to the central axis A, but an overall footprint or size that increases with each successive circumferential layer 54 (in the radially outward direction). For example, the openings 52-2a, 52-2b of the second circumferential layer 54-2 are slightly smaller in circumferential width than the openings 52-3a-52-3c of the third circumferential layer 54-3, and slightly greater in circumferential width that the openings 52-1a-52-1c of the first circumferential layer 54-1. Other relationships are also envisioned.

The openings 52 of each circumferential layer 54 can be uniformly spaced from one another (in the circumferential direction) by the material web 50. Further, the material web 50 radially spaces the openings 52 between adjacent circumferential layers 54 in some embodiments. This optional feature can be described, for example, with reference to a radially outermost edge 60 and a radially innermost edge 62 of the openings 52 (labeled for one of the openings 52 in each of FIGS. 2 and 3). In some embodiments, the radially outermost edge 60 of all the openings 52 of a particular one of the circumferential layers 54 are circumferentially aligned, as are the inner most edges 62. As best seen in FIG. 2, a radial spacing between the openings 52 of successive layers 54 can include the radially outermost edges 60 of the openings 52 of a particular layer 54 collectively define a diameter that is less than a diameter collectively defined by the radially innermost edges 62 of the openings 52 of the radially-next layer 54 (e.g., a diameter collectively defined by the outermost edges 60 of the openings 52 of the first circumferential layer 54-1 is less than a diameter collectively defined by the innermost edges 62 of the openings of the second circumferential layer 54-2). Alternatively stated, a radial spacing exists between the radially outermost edge 60 of a particular opening 52 and the radially innermost edge 62 of the opening 52 most proximate (closest to) the particular opening 52 in the radially-next layer 54. By way of example, the radially outermost edge 60 of the second opening 52-1b of the first circumferential layer 54-1 is radially spaced from the radially innermost edge 62 of each of the first and second openings 52-2a, 52-2b of the second circumferential layer 54-2.

Figure 4:
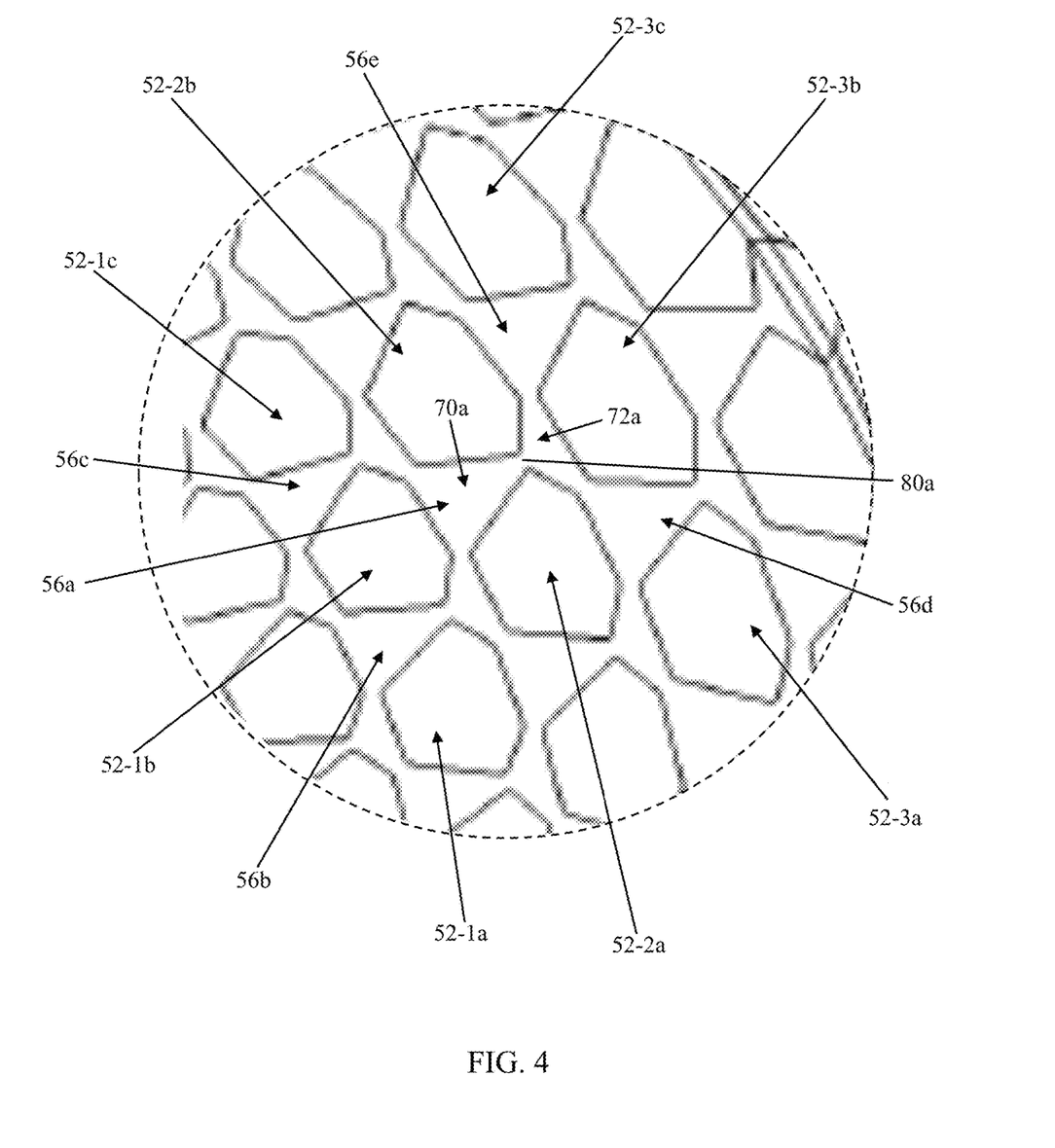
FIG. 4 is an further enlarged view of a portion of FIG. 3.

The support arrangements 56 provided by the material web 50 can assume geometries that promote the topological polarization of the present disclosure. For example, a first support arrangement 56a is generally identified in FIG. 3, and is shown in greater detail in the further enlarged view of FIG. 4. With cross-reference between FIGS. 3 and 4, the support arrangement 56a interconnects the openings 52 of the first, second and third circumferential layers 54-1, 54-2, 54-3. For example, the support arrangement 56a extends between and directly connects the first and second openings 52-2a, 52-2b of the second circumferential layer 54-2. In the radial plane perpendicular to central axis A (FIG. 2), the support arrangement 56a defines first and second triangular shapes 70a, 70b between the first and second openings 52-2a, 52-2b. The first and second triangular shapes 70a, 72a intersect at a first hinge or node 80a. The first triangular shape 70a is further connected to the second opening 52-1b of the first circumferential layer 54-1. The second triangular shape 72a is further connected second opening 53-2b of the third circumferential layer 54-3. In some embodiments, the triangular shapes 70a, 72a are selected such that the first hinge 80a is located more proximate the outermost radial edge 60 (FIG. 3) than the innermost radial edge 62 (FIG. 3) of the openings 52-2a, 52-2b. For example, the second triangular shape 72a is smaller than, and is stacked top of (in the radially outward direction) of, the first triangular shape 70a. This same support arrangement or unit cell is quasi-periodically repeated through the lattice structure 30, with various ones connected to the first support arrangement 56a. For example, a second support arrangement 56b is defined between the first and second openings 52-1a, 52-1b of the first circumferential layer 54-1; a third support arrangement 56c is defined between the second and third openings 52-1b, 52-1c of the first circumferential layer 54-1; a fourth support arrangement 56d is defined between the first and second openings 52-3a, 52-3b of the third circumferential layer 54-3; a fifth support arrangement 56e is defined between the second and third openings 52-3b, 52-3c of the third circumferential layer 54-3.

Figure 5:
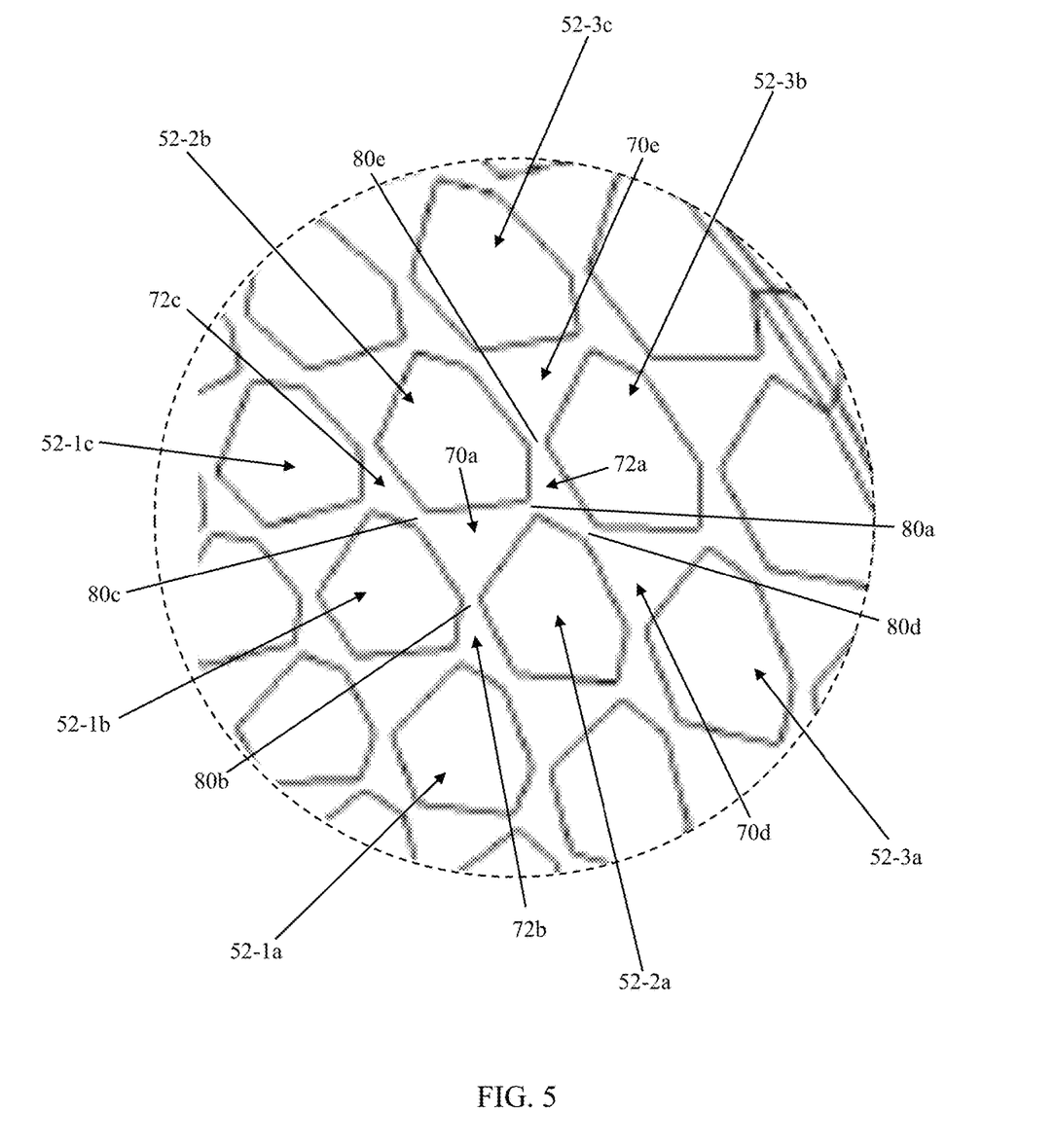
FIG. 5 is a reproduction of the view of FIG. 4, presenting different element numbering.
Figure 6A:
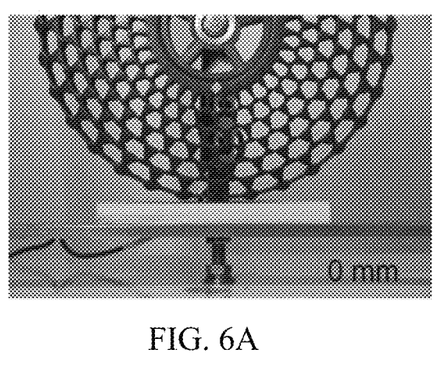
FIGS. 6A-6F are photographs of distributed terrain experiments described in the Examples section.
Figure 6B:
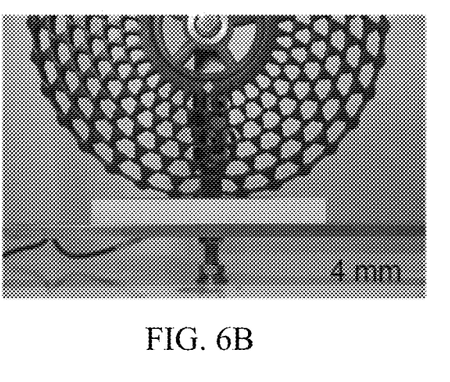
Figure 6C:
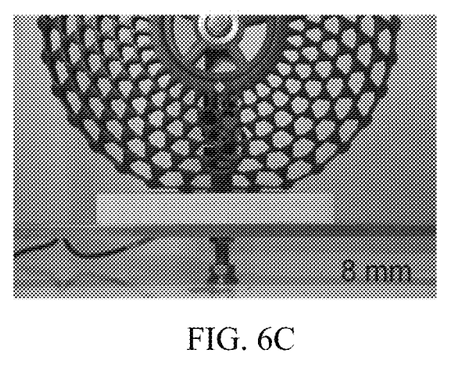
Figure 6D:
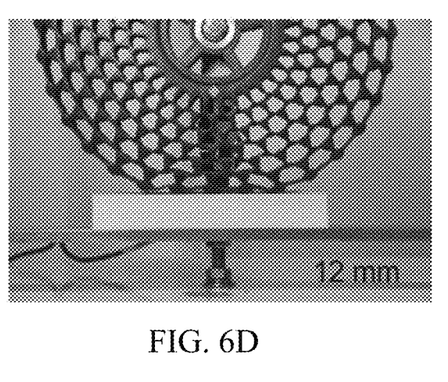
Figure 6E:
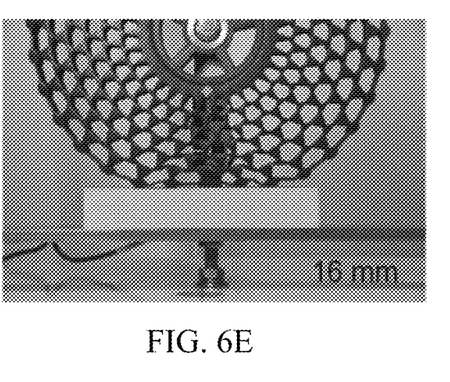
Figure 6F:
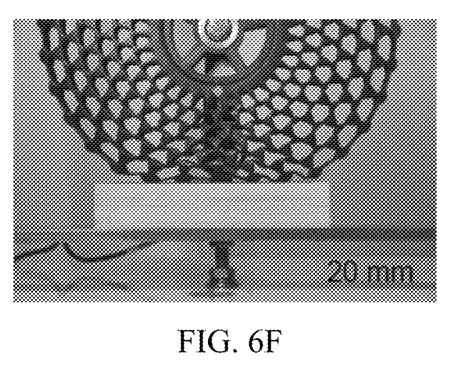
Figure 7A:
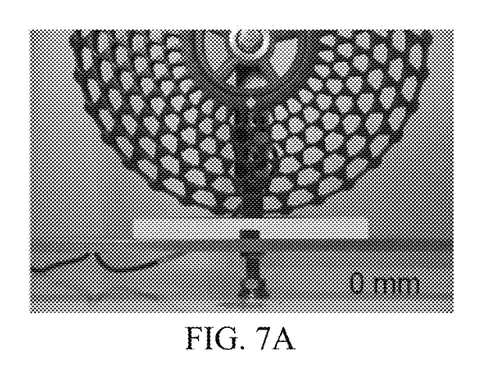
FIGS. 7A-7F are photographs of localized asperity terrain experiments described in the Examples section.
Figure 7B:
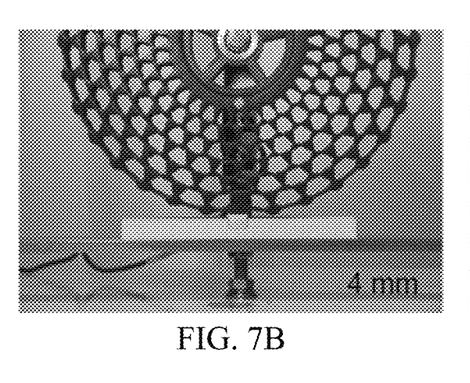
Figure 7C:
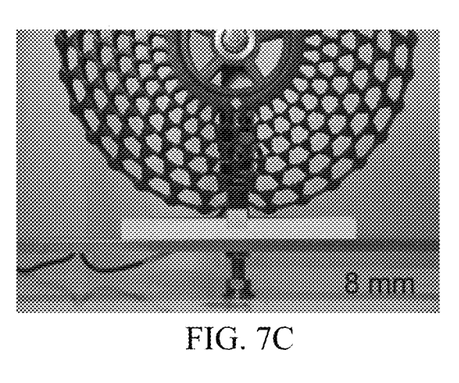
Figure 7D:
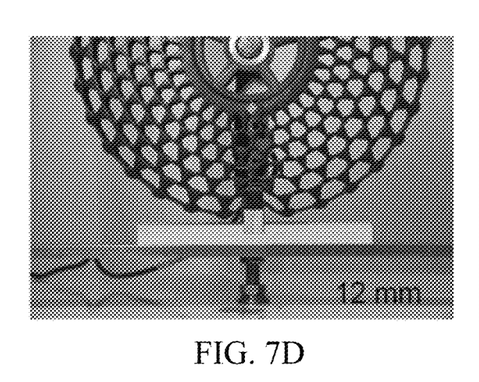
Figure 7E:
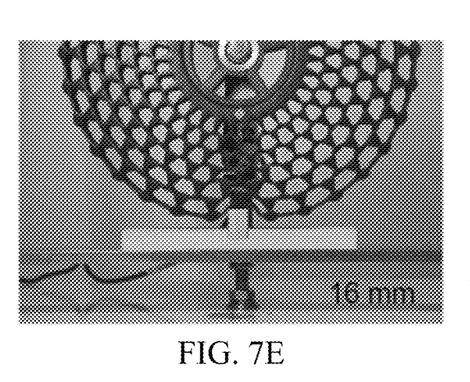
Figure 7F:
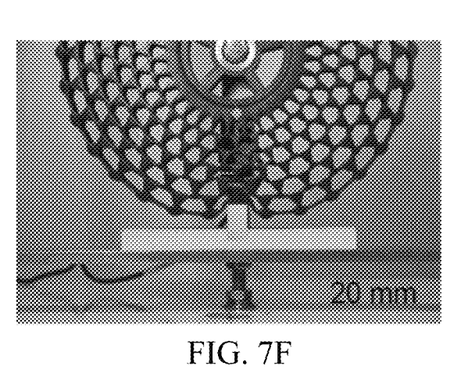

With additional reference to FIG. 5 (that is otherwise identical to FIG. 4 but with various element numbers omitted for ease of understanding), the first support arrangement 56a is connected to each of the second-fifth support arrangements 56b-56e as follows. The second support arrangement 56b includes, in the radial plane, a second triangular shape 72b extending between and directly connecting the first opening 52-2a of the second circumferential layer 54-2 with the first and second openings 52-1a. 52-1b of the first circumferential layer 54-2. The first triangular shape 70a of the first support arrangement 56a and the second triangular shape 72b of the second support arrangement 56b are connected at and share a common, second hinge 80b. The third support arrangement 56c includes, in the radial plane, a second triangular shape 72c extending between and directly connecting the second opening 52-2b of the second circumferential layer 54-2 with the second opening and third openings 52-1b, 52-1c of the first circumferential layer 54-1. The first triangular shape 70a of the first support arrangement 56a and the second triangular shape 72c of the third support arrangement 56c are connected at and share a common, third hinge 80c. The fourth support arrangement 56d includes, in the radial plane, a first triangular shape 70d extending between and directly connecting the first opening 52-2a of the second circumferential layer 54-2 with the first and second openings 52-3a, 52-3b of the third circumferential layer 54-3. The second triangular shape 72a of the first support arrangement 56a and the first triangular shape 70d of the fourth support arrangement 56d are connected at and share a common, fourth hinge 80d. The fifth support arrangement 56e includes, in the radial plane, a first triangular shape 70e extending between and directly connecting the second opening 52-2b of the second circumferential layer 54-2 with the second and third openings 52-3b. 52-3c of the third circumferential layer 54-3. The second triangular shape 72a of the first support arrangement 56a and the first triangular shape 70e of the fifth support arrangement 56e are connected at and share a common, fifth hinge 80e.

With the support arrangement 56 configurations as above, the first hinge 80a is connected to the second—fifth hinges 80b-80e. This same support arrangement 56 is quasi-periodically repeated throughout the lattice structure 32, whereby for all internal cells or support arrangement 56, every hinge between two, immediately adjacent openings 52 is connected to four other hinges, regardless of an exact shape of the openings 52. This repeated construction can promote the topological polarization characteristics of the present disclosure. Further, by repeating the support arrangement (and opening shape) throughout all of the layers 54, topological protection is provided. This topological protection means that as an outermost surface or layer of the lattice structure 32 wears or erodes away, the remaining layers 54 continue to exhibit the topological polarization and the non-pneumatic tire 20 remains functional. Other lattice structure configurations are also envisioned that may or may not include the irregular hexagonal-shaped openings 52 and/or individual hinges being connected to four other hinges.

Returning to FIGS. 1 and 2, the non-pneumatic tires 20 of the present disclosure can be manufactured in various manners. In some embodiment, at least the lattice structure 32, and in some embodiments at least the inner annular band 30 and the lattice structure 32, can be created from a simple extrusion of a 2D profile into the third dimension. This makes the design exceptionally easy for either industrial or rapid manufacturing (e.g., 3D printing). This ease of manufacture is counter to traditional pneumatic tires that typically require an eight step manufacturing process, which aside from being complex, also produces concerning amounts of noxious gases.

The non-pneumatic tires of the present disclosure can be used as the tire of any type of device or machine intended to be propelled or moved over the ground/terrain. For example, the non-pneumatic tires can be used with virtually any type of vehicle, including manually-propelled (e.g., bicycle) or motorized (e.g., motorcycles, cars, trucks, etc.). In some embodiments, the non-pneumatic tires of the present disclosure may be of particular usefulness with space exploration and military vehicles. With many of these end-use applications, the vehicle in question is expected to be operated in regions with rough or rugged terrain. In these harsh environments, the non-pneumatic tires of the present disclosure are well-suited to absorb asperities in the terrain without transmitting significant forces to the vehicle's axle. When the vehicle in question is carrying scientific measurement equipment, this feature can be important as large impacts transferred to the body of the vehicle could perturb data collection or worse permanently damage the scientific instruments. Further, the ability to absorb asperities can serve the additional purpose of diminishing the need for a suspension system with the vehicle. With many space exploration and military vehicles, simplicity of design can be essential because they operate in remote conditions where maintenance is not readily available. Along these same lines, the topological protection features of the present disclosure preserve the topological polarization even in the event of wear or puncture, an attribute that can be quite important where vehicle maintenance is difficult to perform. Moreover, the ability to 3D print the non-pneumatic tires of the present disclosure from a singular material based on a simple extrusion form a 2D profile means that the tires are well adapted for rapid manufacturing production. This feature, in turn, can be highly useful for remote locations were supplies are difficult to import.

Embodiments and advantages of features of the present disclosure are further illustrated by the following non-limiting examples, and the particular materials and amounts thereof recited in these examples, as well as other conditions and details, should not be construed to limit the scope of the present disclosure.

EXAMPLES

A working prototype of a non-pneumatic tire akin to the non-pneumatic tire 20 of FIG. 1 was manufactured through PolyJet 3D printing. To evaluate an ability of the lattice structure to absorb asperities, a hub was assembled to the inner annular band 30. The hub carried a bearing assembly, and was mounted to an axle. The axle, in turn, was mounted to a load cell assembly that in turn was mounted to a steel plate in a cantilever fashion. The non-pneumatic tire was then subjected to various test conditions intended to represent a distributed terrain and a localized asperity terrain, and axial forces were measured by the load cell during each test. These axial forces were then converted to "normal forces" which captured the force exerted to the tire by the portion of the terrain in contact with it. For example, FIGS. 6A-6F are photographs of experiments performed with representations of a distributed terrain; the non-pneumatic tire was subjected to 0 millimeter (FIG. 6A) to 20 millimeter (FIG. 6F) indentations at 4 millimeter increments. FIGS. 7A-7F are photographs of experiments performed with representations of a localized asperity terrain; the non-pneumatic tire was subjected to a 0 millimeter (FIG. 7A) to 20 millimeter (FIG. 7F) localized indentation at 4 millimeter increments.

Figure 8:
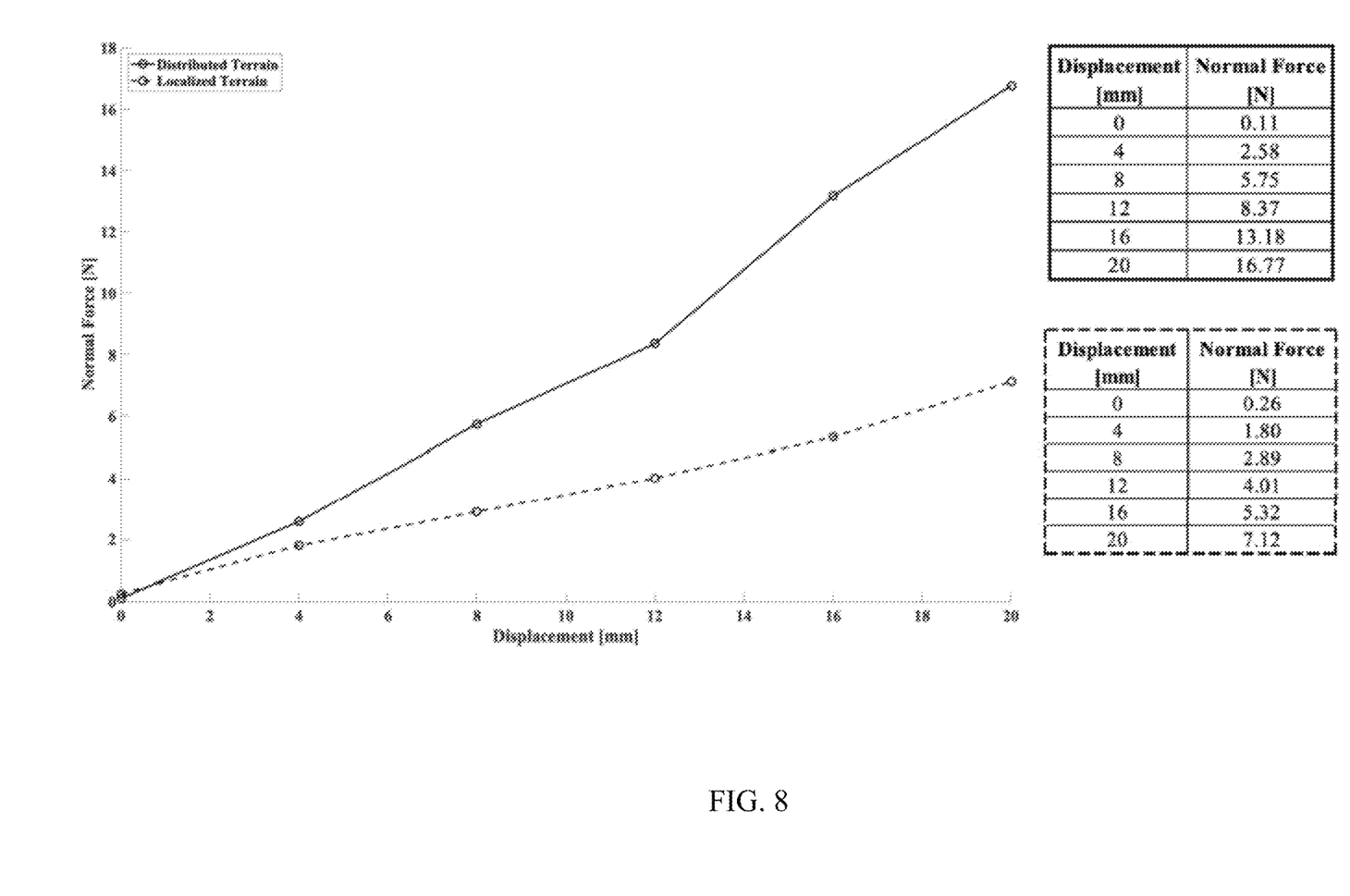
FIG. 8 is a graph illustrating results of experiments to investigate normal forces experienced by an inner annular band of a non-pneumatic tire in accordance with principles of the present disclosure under various distributed terrain and localized asperity terrain test conditions.
Figure 9:
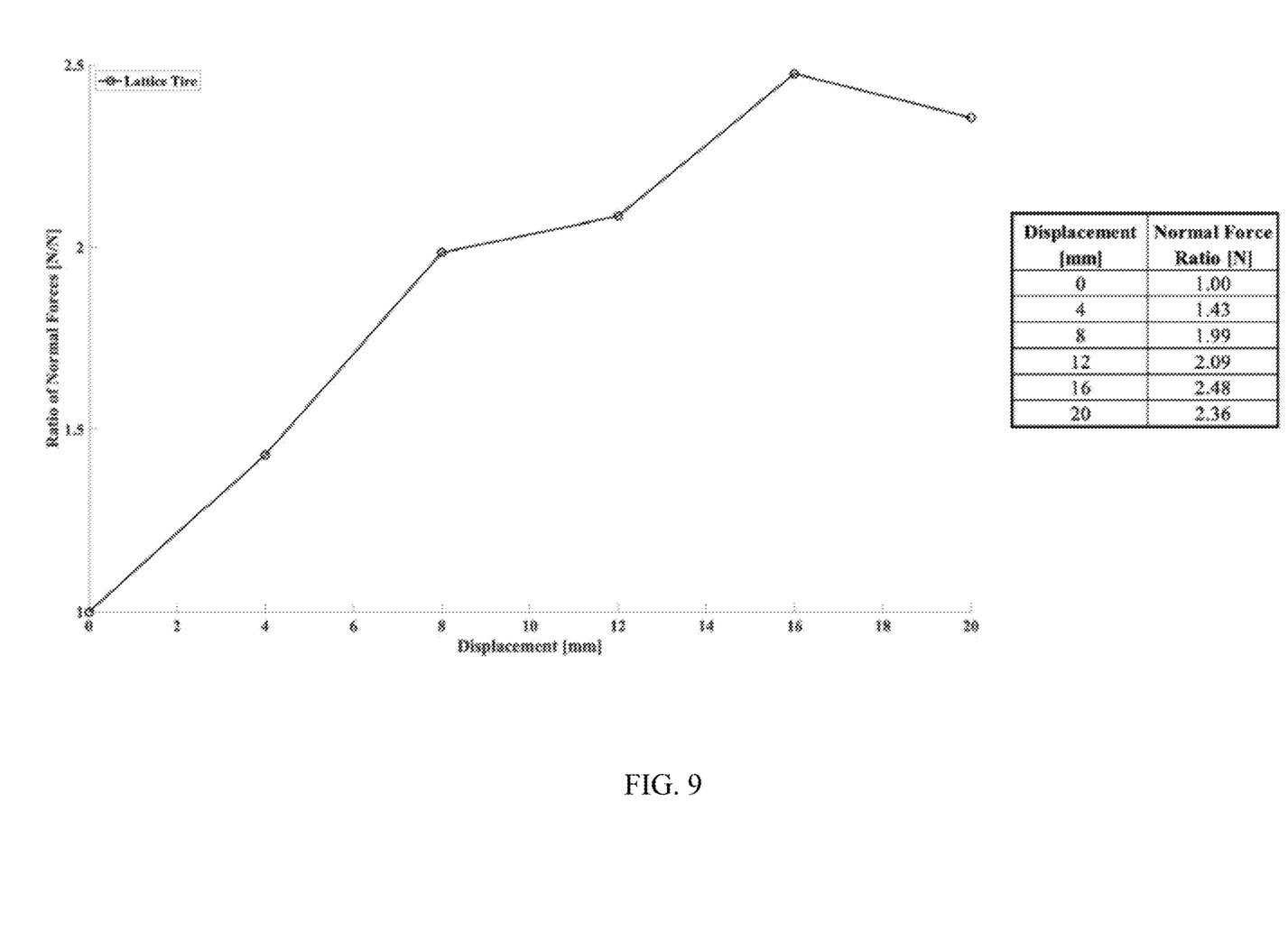
FIG. 9 is a graph illustrating a comparison of the experimental results of FIG. 8, and in particular a ratio between distributed terrain and localized asperity terrain normal forces.

FIG. 8 is a plot of the measured normal force at each indentation or displacement test, under both the distributed terrain and localized asperity terrain conditions. FIG. 9 is a plot of a ratio between the measured normal force under the distributed terrain and localized asperity terrain conditions at each indentation or displacement level tested.

Figure 10:
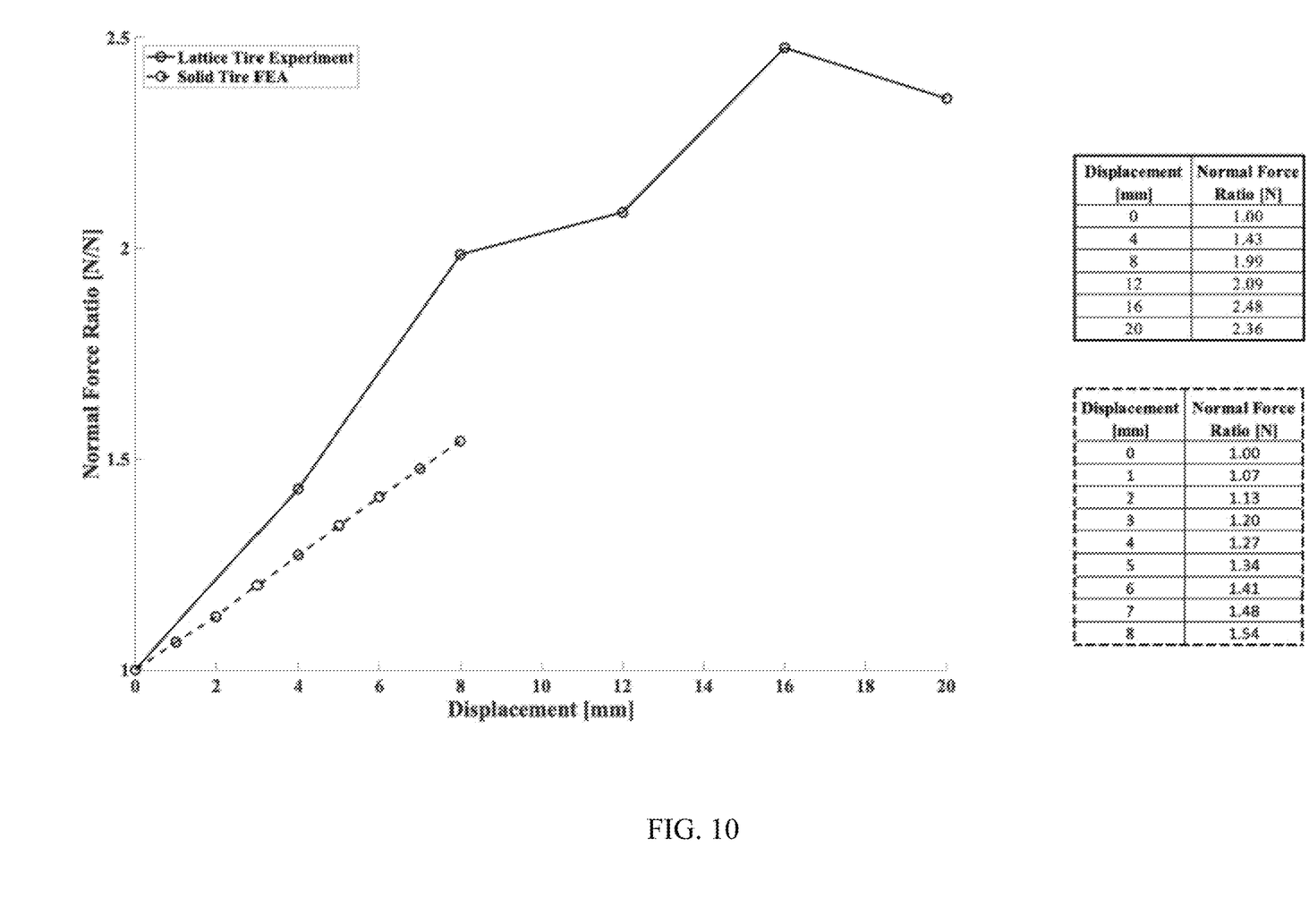
FIG. 10 is a graph comparing performance of the example non-pneumatic tire with a simulated solid non-pneumatic tire.

A comparative example non-pneumatic tire was simulated as a solid body from the same material used to generate the example non-pneumatic tire lattice structure, and subjected to the same experiments (FEA simulation) as described above. FIG. 10 is a plot comparing the ratio of normal forces for the solid tire FEA with the experimental results for the example lattice tire. As a point of reference, in the results reported in FIG. 10, the plot line for the comparative example solid tire simulation only goes to 8 millimeters; this resulted from the mesh for the localized asperity terrain simulation becoming highly deformed at 8 millimeters, and the stress in the tire near the localized loading actually began to approach a point at which it would fail. It was observed that the normal force ratio grows much faster for the example lattice tire as compared to the comparative example solid tire. From this comparison, and from other observations, it was determined that the lattice tire of the present disclosure has an enhanced ability to absorb asperities locally while not transferring large forces to the axle, and despite this localized softness, a stiff response to distributed loading (which equates to practical weight bearing capability) is preserved.

The non-pneumatic tires of the present disclosure provide a marked improvement over previous designs. The lattice structures implemented by the non-pneumatic tires of the present disclosure provide topological polarization and topological protection, in direct contrast to conventional non-pneumatic tire designs. For example, the lattice structure endows the tire with localized softness along the outer radius, which enables extreme absorption of asperities, without transferring significant forces to the axle. The localized softness can serve as a quasi-suspension system, which under certain end-use circumstances, could render a typical vehicle suspension system unnecessary. Despite localized softness, the non-pneumatic tire can have a stiff response to distributed loadings that results in practical weight bearing capabilities. Because of topological protection, the mechanical behavior of the outer edge (i.e., the properties of topological polarization) is preserved even if entire radial cell layers have been eroded by wear. This endows the tire design with resistance to performance deterioration from wear. The non-pneumatic design makes the tire relatively immune to performance loss from material damage (e.g., the operational status of the non-pneumatic tires of the present disclosure is robust and even immune in some cases to punctures, cuts, impacts, and other forms of material damage, all of which often subsequently lead to air loss and rapidly diminished structural integrity in pneumatic tires). Also, the designs of the present disclosure can promote rapid manufacturing. The lattice designs can be based on a 2D profile that is extruded into the third dimension, and is thus highly appropriate, for example, for 3D printing.

Although the present disclosure has been described with reference to preferred embodiments, workers skilled in the art will recognize that changes can be made in form and detail without departing from the spirit and scope of the present disclosure.

What is claimed is:

1. A non-pneumatic tire defining axial, radial, and circumferential directions, the non-pneumatic tire comprising:
   an inner annular band;
   an annular lattice structure extending radially from the inner annular band, the lattice structure defining a plurality of circumferential layers each with a repeating pattern of circumferentially-aligned openings, the circumferential layers including:
     a first circumferential layer, and
     a second circumferential layer immediately radially outside of, and circumferentially surrounding, the first circumferential layer;
   wherein the openings of the first circumferential layer are circumferentially off-set from the openings of the second circumferential layer;
   and further wherein:
     each of the openings of the first circumferential layer terminate at a radially outermost edge and at a radially innermost edge,
     each of the openings of the second circumferential layer terminate at a radially innermost edge and at a radially outermost edge, and
     the radially outermost edge of each of the openings of the first circumferential layer is radially spaced from the radially innermost edge of each of the openings of the second circumferential layer in a direction of the inner annular band such that the radially outermost edge of each of the openings of the first circumferential layer is closer to the inner annular band than the radially innermost edge of each of the openings of the second circumferential layer;
   wherein a material web interconnects the openings of the first and second circumferential layers, and further wherein the material web defines a first support arrangement extending between and directly connecting first and second, immediately circumferentially adjacent openings of the second circumferential layer, and even further wherein in a radial plane perpendicular to central axis of the tire, the first support arrangement defines first and second triangular shapes between the first and second openings, the first and second triangular shapes each extending between and interconnecting the first and second, immediately circumferentially adjacent openings of the second circumferential layer and intersecting at a first hinge;
   wherein the material web further defines a second support arrangement extending between and interconnecting first and second, immediately circumferentially adjacent openings in the first circumferential layer, the second support arrangement defining, in the radial plane, first and second triangular shapes that each extend between and interconnect the first and second, immediately circumferentially adjacent openings in the first circumferential layer, the second triangular shape of the second support arrangement extending between and directly connecting the first opening of the second circumferential layer with the first and second openings of the first circumferential layer, and further wherein the first triangular shape of the first support arrangement and the second triangular shape of the second support arrangement share a common, second hinge, wherein the first and second triangular shapes of the first support arrangement are separate from the first and second triangular shapes of the second support arrangement.

2. The non-pneumatic tire of claim 1,
wherein the annular lattice structure extends radially between an inner circumferential edge at the inner annular band and an outer circumferential edge;
wherein the lattice structure exhibits topological polarization.

3. The non-pneumatic tire of claim 2, wherein the topological polarization includes the inner circumferential edge being stiffer than the outer circumferential edge.

4. The non-pneumatic tire of claim 2, wherein the topological polarization includes asymmetry in mechanical response to opposing forces applied to the inner and outer circumferential edges.

5. The non-pneumatic tire of claim 2, wherein the lattice structure further exhibits topological protection, including the topological polarization characteristic being maintained upon experiencing wear at the outer circumferential edge.

6. The non-pneumatic tire of claim 2, wherein the lattice structure is a Kagome lattice arrangement.

7. The non-pneumatic tire of claim 1, wherein the openings of the first circumferential layer are not radially aligned with the openings of the second circumferential layer.

8. The non-pneumatic tire of claim 1, wherein the plurality of circumferential layers further includes a third circumferential layer immediately radially outside of, and circumferentially surrounding, the second circumferential layer, and further wherein the openings of the second circumferential layer are circumferentially off-set from the openings of the third circumferential layer.

9. The non-pneumatic tire of claim 8, wherein a line in a radial plane perpendicular to a central axis of the tire bisects a shape of at least one of the openings of both the first and third circumferential layers.

10. The non-pneumatic tire of claim 9, wherein the line does not bisect a shape of any of the openings of the second circumferential layer.

11. The non-pneumatic tire of claim 1, wherein each of the openings defines a hexagonal shape in a radial plane perpendicular to a central axis of the tire.

12. The non-pneumatic tire of claim 11, wherein the hexagonal shape is an irregular hexagon.

13. The non-pneumatic tire of claim 1, wherein each of the openings extend axially through a thickness of the lattice structure.

14. The non-pneumatic tire of claim 1, wherein the material web further defines a third support arrangement extending between and interconnecting the second opening in the first circumferential layer with a third opening in the first circumferential layer, the third opening being immediately circumferentially adjacent the second opening in the first circumferential layer, the third support arrangement defining, in the radial plane, first and second triangular shapes, the second triangular shape of the third support arrangement extending between and directly connecting the second opening of the second circumferential layer with the second opening of the first circumferential layer and a third opening of the first circumferential layer, and further wherein the first triangular shape of the first support arrangement and the second triangular shape of the third support arrangement share a common, third hinge.

15. The non-pneumatic tire of claim 14, wherein the plurality of circumferential layers further includes a third circumferential layer immediately radially outside of, and circumferentially surrounding, the second circumferential layer, and further wherein the material web further defines a fourth support arrangement extending between and interconnecting first and second, immediately circumferentially adjacent openings in the third circumferential layer, the fourth support arrangement defining, in the radial plane, first and second triangular shapes, the first triangular shape of the fourth support arrangement extending between and directly connecting the first opening of the second circumferential layer with first and second openings of the third circumferential layer, and further wherein the second triangular shape of the first support arrangement and the first triangular shape of the fourth support arrangement share a common, fourth hinge.

16. The non-pneumatic tire of claim 15, wherein the material web further defines a fifth support arrangement extending between and interconnecting the second opening in the third circumferential layer with a third opening in the third circumferential layer, the third opening in the third circumferential layer being immediately circumferentially adjacent the second opening in the third circumferential layer, the fifth support arrangement defining, in the radial plane, first and second triangular shapes, the first triangular shape extending between and directly connecting the second opening of the second circumferential layer with the second opening of the third circumferential layer and a third opening of the third circumferential layer, and further wherein the second triangular shape of the first support arrangement and the first triangular shape of the fifth support arrangement share a common, fifth hinge.

17. The non-pneumatic tire of claim 16, wherein the first hinge is connected to each of the second hinge, the third hinge the fourth hinge, and the fifth hinge.

18. The non-pneumatic tire of claim 1, wherein the lattice structure includes a repeating pattern of the first support arrangement.

* * * * *